United States Patent
Nellen et al.

(10) Patent No.: US 9,751,387 B2
(45) Date of Patent: Sep. 5, 2017

(54) METHOD OF ASSEMBLING A ROOF ASSEMBLY AND SUCH ROOF ASSEMBLY

(71) Applicant: Inalfa Roof Systems Group B.V., Oostrum (NL)

(72) Inventors: Marcel Johan Christiaan Nellen, Merselo (NL); Peter Christiaan Leonardus Johannes Manders, Horst (NL)

(73) Assignee: INALFE ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/092,374

(22) Filed: Apr. 6, 2016

(65) Prior Publication Data

US 2016/0297286 A1    Oct. 13, 2016

(30) Foreign Application Priority Data

Apr. 9, 2015   (EP) .................................. 15162977

(51) Int. Cl.
| | |
|---|---|
| *B60J 7/057* | (2006.01) |
| *F16C 1/10* | (2006.01) |
| *B60J 7/02* | (2006.01) |

(52) U.S. Cl.
CPC ............ *B60J 7/0573* (2013.01); *B60J 7/022* (2013.01); *F16C 1/101* (2013.01); *B60Y 2410/12* (2013.01)

(58) Field of Classification Search
CPC ..................................................... F16C 1/101
USPC ............. 296/223, 216.08; 74/502.6; 403/373
See application file for complete search history.

(56) References Cited

U.S. PATENT DOCUMENTS

| | | | | |
|---|---|---|---|---|
| 2,296,993 | A * | 9/1942 | Gerry ...................... | F16B 7/22 285/331 |
| 2,416,206 | A * | 2/1947 | Norton ..................... | F16C 1/00 74/502.5 |
| 2,890,066 | A * | 6/1959 | Kerr ...................... | F16L 37/138 285/298 |
| 4,719,316 | A * | 1/1988 | Hoffman ................ | E21B 19/12 174/88 R |
| 5,104,178 | A * | 4/1992 | Bienert .................... | B60J 7/022 296/213 |
| 5,246,303 | A * | 9/1993 | Trilla ...................... | F16C 1/101 24/687 |

(Continued)

FOREIGN PATENT DOCUMENTS

| | | |
|---|---|---|
| DE | 3428919 A1 | 2/1986 |
| DE | 10325327 B3 | 3/2005 |

(Continued)

OTHER PUBLICATIONS

International Search Report for corresponding European patent application No. 15162977.1 dated Sep. 18, 2015, 7 pages.

*Primary Examiner* — Dennis H Pedder
(74) *Attorney, Agent, or Firm* — Steven M. Koehler; Westman, Champlin & Koehler, P.A.

(57) ABSTRACT

A method of assembling a roof assembly for a vehicle comprises providing a first frame part having a drive element guide, providing a second frame part having a drive element guide and providing a drive element configured to drive a movable part of the roof assembly and being driven by a drive motor. The first and second frame parts are mounted to each other such that the drive element extends from the drive element guide of the first frame part to the drive element guide of the second frame part.

17 Claims, 13 Drawing Sheets

(56) References Cited

U.S. PATENT DOCUMENTS

| | | | |
|---|---|---|---|
| 5,381,706 A * | 1/1995 | Yanusko | F16C 1/10 403/58 |
| 5,409,330 A * | 4/1995 | Naines | F16G 11/00 24/116 A |
| 5,836,061 A * | 11/1998 | Castillo | F16C 1/14 24/115 R |
| 6,196,625 B1 | 3/2001 | Nagashima et al. | |
| 6,431,644 B1 * | 8/2002 | Nagashima | B60J 7/022 296/216.08 |
| 6,582,014 B1 | 6/2003 | Racine et al. | |
| 6,604,782 B2 * | 8/2003 | De Gaillard | B60J 7/028 296/106 |
| 6,830,291 B2 | 12/2004 | Langguth | |
| 6,974,183 B2 | 12/2005 | Bergmiller et al. | |
| 7,354,103 B2 | 4/2008 | Esteban | |
| 7,914,072 B2 | 3/2011 | Queener | |
| 8,075,050 B2 | 12/2011 | Hotta | |
| 2009/0095118 A1 * | 4/2009 | Kim | B63H 25/10 74/502.5 |
| 2010/0231007 A1 | 9/2010 | Freeman | |
| 2010/0320808 A1 | 12/2010 | Marx | |
| 2012/0049584 A1 | 3/2012 | Manders | |

FOREIGN PATENT DOCUMENTS

| | | |
|---|---|---|
| DE | 102006051488 A1 | 5/2008 |
| EP | 2425997 A1 | 3/2012 |
| GB | 1451734 A | 10/1976 |
| JP | 2001301466 A | 10/2001 |
| WO | 2007128290 A1 | 11/2007 |

* cited by examiner

METHOD OF ASSEMBLING A ROOF ASSEMBLY AND SUCH ROOF ASSEMBLY

BACKGROUND

The discussion below is merely provided for general background information and is not intended to be used as an aid in determining the scope of the claimed subject matter.

Aspects of the invention relate to a method of assembling a roof assembly for a vehicle, comprising providing a first frame part having a drive cable guide; providing a second frame part having a drive cable guide; providing a drive cable configured to drive a movable part of the roof assembly and being driven by a drive motor, and mounting the first and second frame parts to each other such that the drive cable extends from the drive cable guide of the first frame part to the drive cable guide of the second frame part. The invention also relates to a roof assembly.

In such a method used in practice, in which the frame comprises a front beam and two longitudinal guides, it is preferred to connect the longitudinal guides to the front beam in a so-called top-loaded manner in which the longitudinal guides are assembled with the front beam from above. It has become more practical to pre-assemble the frame parts including the movable part, the drive element guides and the drive element, before the frame parts are connected to each other. The problem is then however that the drive element, which is a flexible drive cable, projects from the second frame part and must be threaded into the drive element guide of the first frame part before both frame parts can be assembled. This assembly method is cumbersome and time consuming.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention is a drive element includes a first drive element portion and a second drive element portion, the first drive element portion being pre-mounted in the cable guide of the first frame part. The second drive element portion is pre-mounted in the cable guide of the second frame part. The first and second drive element portions are coupled to each other when the first and second frame parts have been mounted to each other.

Due to the drive element being divided into first and second drive element portions, it is possible to preassemble both drive element portions and couple them during or shortly after the first and second frame parts are connected to each other.

In one embodiment, the first and second drive element portions are coupled to each other at a position at or close to a connection between the drive element guide of the first frame part to the drive element guide of the second frame part, in which the drive cable portions slightly protrude at least partly from the drive element guides, such that they can be coupled.

In this manner, coupling the drive element portions is easiest. It is possible that the drive element guides in the first and second frame parts are partly taken away to expose the ends of the drive element portions so that they can be coupled, but the drive element guides connect to each other hardly without an interruption so that a stable guidance of the drive element is guaranteed. This is especially important if at least one of the drive elements, in particular the first drive element, is a flexible drive cable.

The second drive element portion may be connected to the movable part before the first and second frame parts are connected to each other, and wherein the movable part is preferably in its position closest to the first frame part when the drive element portions are interconnected.

This means that the ends of the drive element portions will only move within the drive element guide of the second frame part, so that the ends do not have to pass the transition between the drive element guides.

In one embodiment, the first and second drive element portions are automatically coupled upon connection of the first and second frame parts.

This leads to the easiest assembly as no additional operations are required to couple the ends of the drive element portions.

The roof assembly, which comprises a frame, at least one movable part supported by the frame, a drive motor supported by the frame and a drive element guided by a cable guide supported by the frame and extending at least between the drive motor and the movable part. The frame including at least two frame parts mounted to each other, is characterized in that the drive element comprises at least two drive element portions which are coupled or configured to be coupled to each other at or close to a position where the cable guide of the first frame part connects to the cable guide of the second frame part.

The first frame part may be a transverse beam preferably carrying the drive motor, and the second frame part may be one of the longitudinal guide rails of the frame guiding the movable part.

The movable part will be a movable roof closure (e.g. a rigid panel) or the operating mechanism movably supporting it. Generally, there are two longitudinal guides each guiding an operating mechanism supporting a side of the movable roof closure.

The first and second drive element portions are provided with a coupling member and counter coupling member, respectively.

These coupling and counter coupling members make it easier to connect the ends of the drive element portions, especially if the coupling and counter coupling members are automatic coupling and counter coupling members.

In one embodiment, the coupling member includes a hook-like projection and the counter coupling member includes a recess capable of receiving the hook-like projection.

The hook-like projection is preferably oriented such that it points in the direction of the recess when the first and second frame parts are being connected so that the hook-like projection is automatically engaged with the recess upon connection of the frame parts.

The drive element guides and the coupling and counter coupling members are preferably such that the drive element guides prevent the coupling and counter coupling members from disengaging.

Thus, the coupling will automatically be maintained as long as the coupling and counter coupling members are within the drive element guides.

Alternatively, the coupling and counter coupling members are provided with a fixing element to couple the coupling and counter coupling member together.

This requires an additional fixing operation, but will lead to a very reliable coupling between the drive element portions.

For example, the fixing element is a screw that can be screwed into the coupling and counter coupling members, or a portion of the coupling member can be deformed by a tool to be coupled to the counter coupling member.

As another alternative, the first and second drive element portions are connected to each other by means of a connection method, such as welding.

In a particular embodiment, at least one of the frame parts is provided with guide walls at the position where the drive element guide of the first frame part connects to the drive element guide of the second frame part in order to at least laterally guide the coupling and/or counter coupling member of the drive element portions.

This further improves the guidance of the drive element, in particular the drive cable, and prevents the formation of a gap where the drive cable could escape from the drive element guide when large forces are exerted thereon.

BRIEF DESCRIPTION OF THE DRAWINGS

Further details and advantages of aspects of the invention will be described hereunder with reference to the accompanying drawings.

FIGS. 12a, 12b, 12c -15a, 15b, 15c are a perspective view, an uncoupled perspective view and a cross-sectional view of the coupling member and counter coupling member of the drive cable portions alternative embodiments.

DETAILED DESCRIPTION OF THE ILLUSTRATIVE EMBODIMENTS

Figure 1:
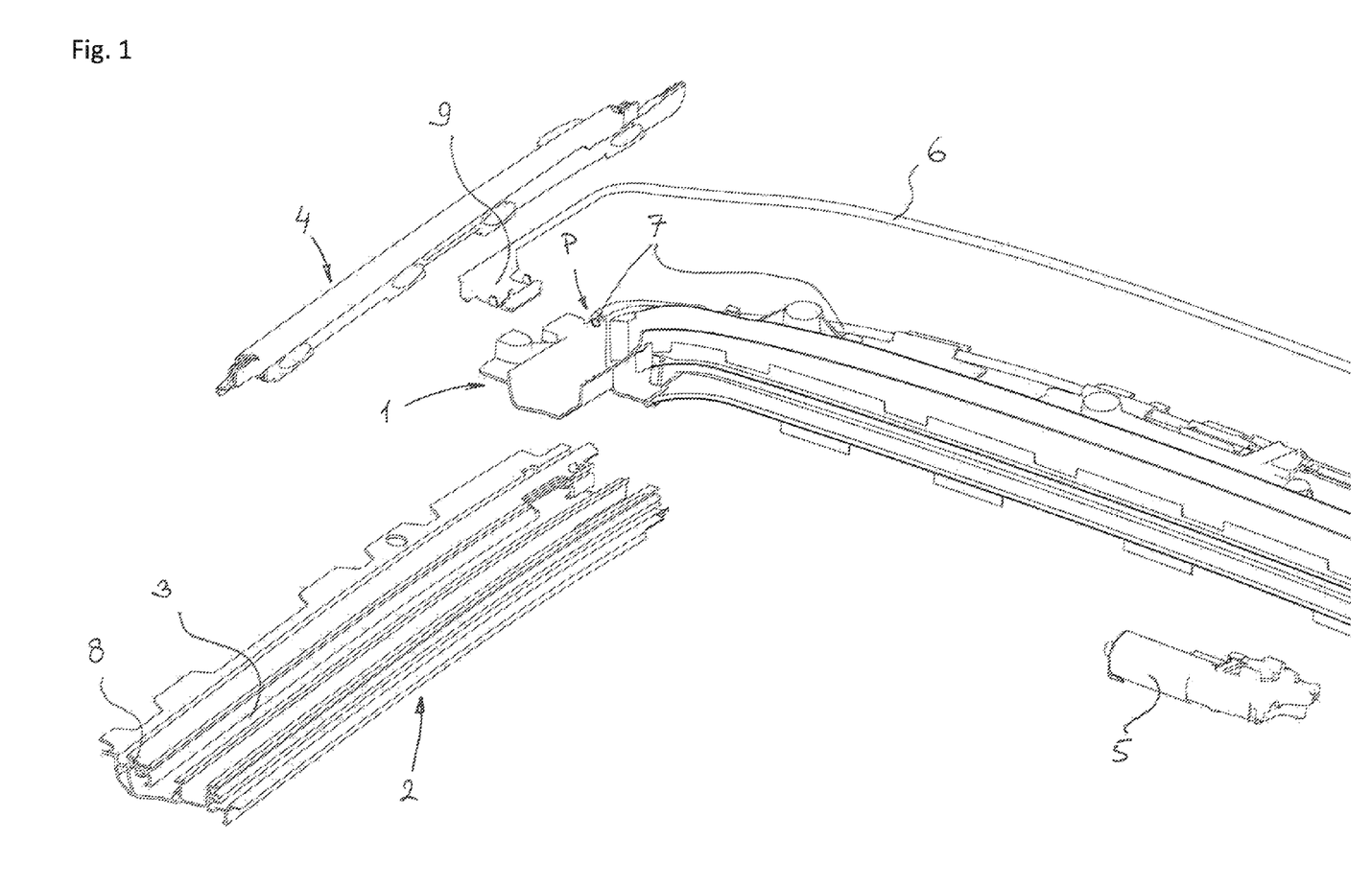
FIGS. 1-3 are simplified perspective views of a prior art roof assembly in three different stages of assembling.
Figure 2:
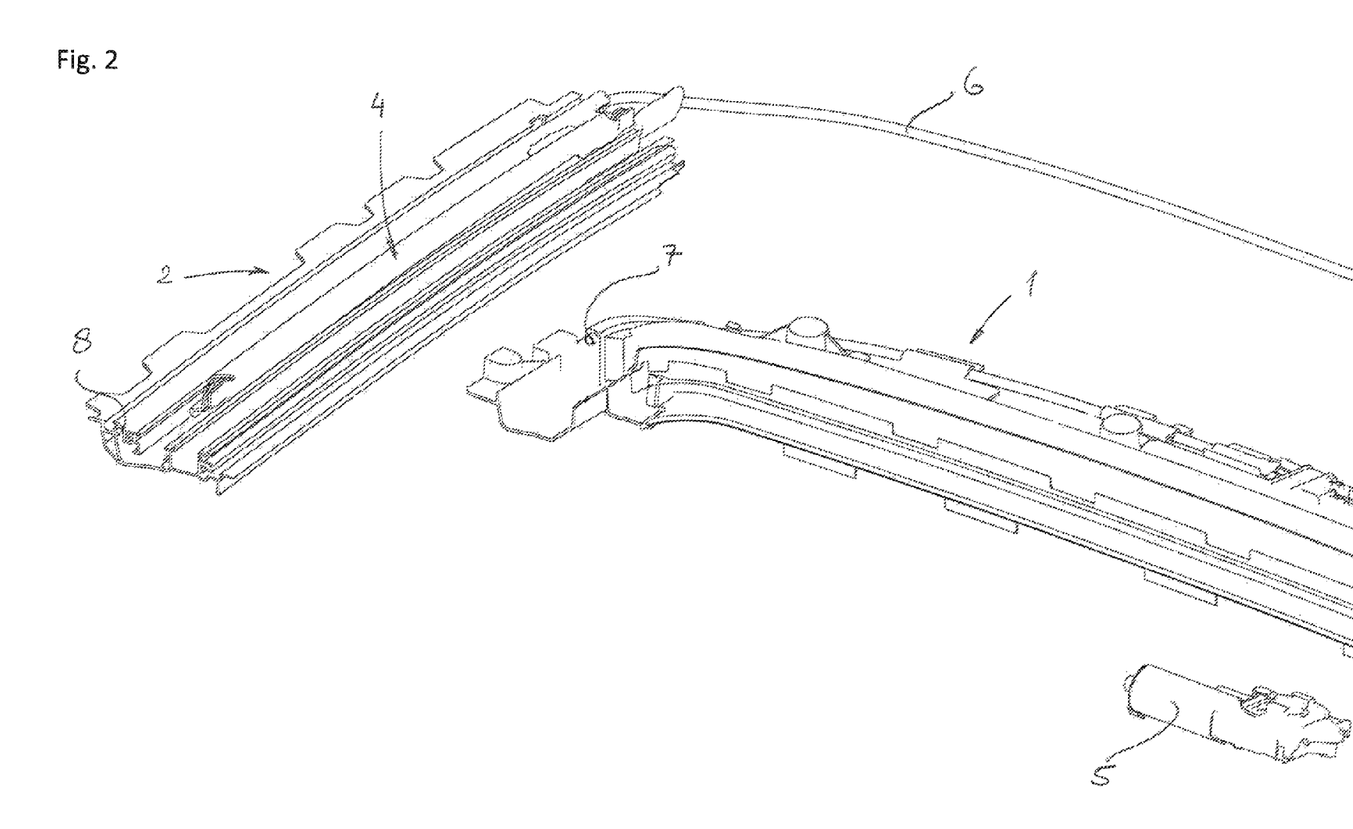
Figure 3:
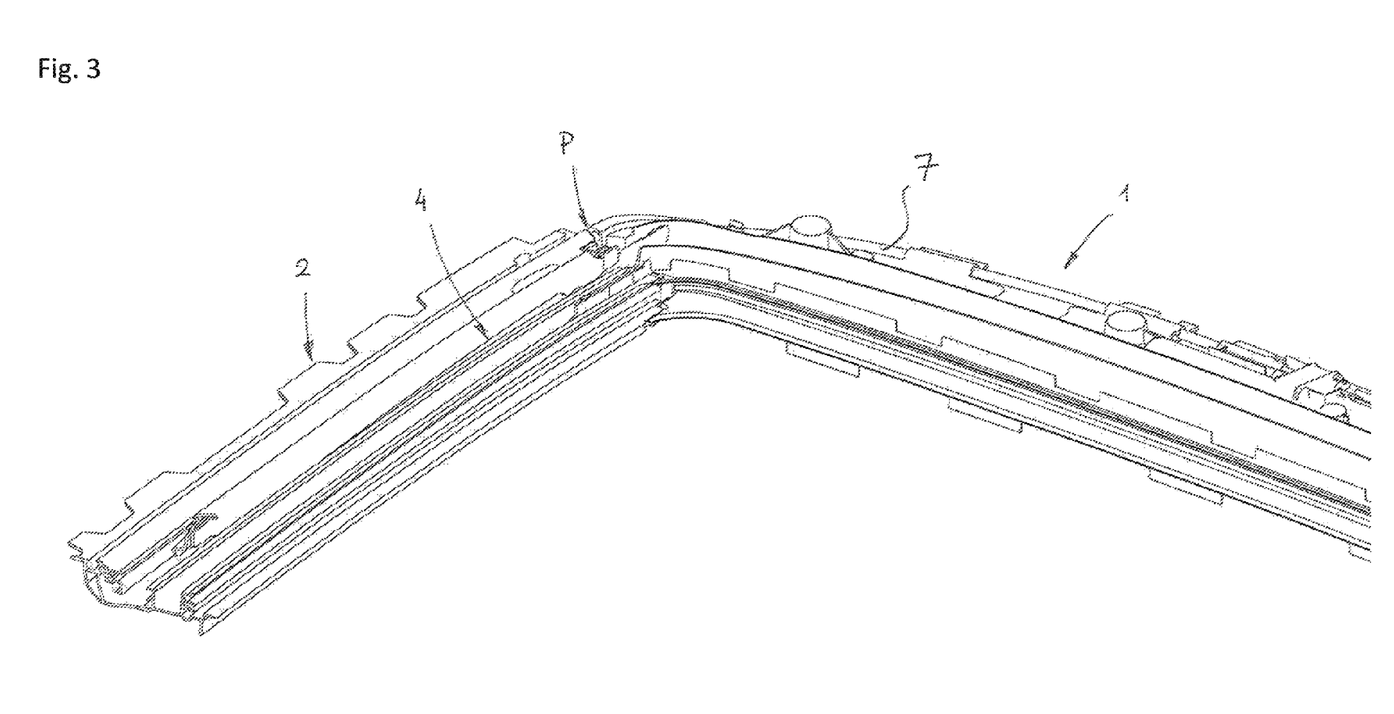

FIGS. 1-3 show a prior art roof assembly comprising a frame for supporting all parts of the roof assembly and for attaching the roof assembly to the vehicle, in particular the fixed roof of a passenger car. In this case the frame includes a front transverse beam 1 and two longitudinal guides 2 (only one is shown) connecting to the ends of the front beam which are oriented rearwardly to be aligned with the longitudinal guides 2. The longitudinal guides 2 are provided with guide rails or guide grooves 3 configured to guide operating mechanisms 4 carrying a rigid transparent panel or other movable and/or stationary roof closure (not shown). An electric motor 5 is attached to the front beam 1 and is capable of driving the operating mechanisms 4 each through a drive element, in this case a push and pull resistant drive cable 6.

This drive cable is guided in the front beam 1 in a drive cable guide 7 and in the longitudinal guide in a drive cable guide 8. These guides 7 and 8 connect at a position P.

FIG. 2 shows how the longitudinal guide 2 is premounted with the operating mechanism 4 and the drive cable 6. This drive cable 6 projects along a great length from the drive cable guide in the longitudinal guide and is thus difficult to handle. Furthermore, in order to be able to connect the longitudinal guide 2 and the front beam 2 to each other, the drive cable 6 must first be threaded into the drive cable guide 7 of the front beam 2 before the connection as shown in FIG. 3 can be made. This complicates and slows down the production process.

Figure 4:
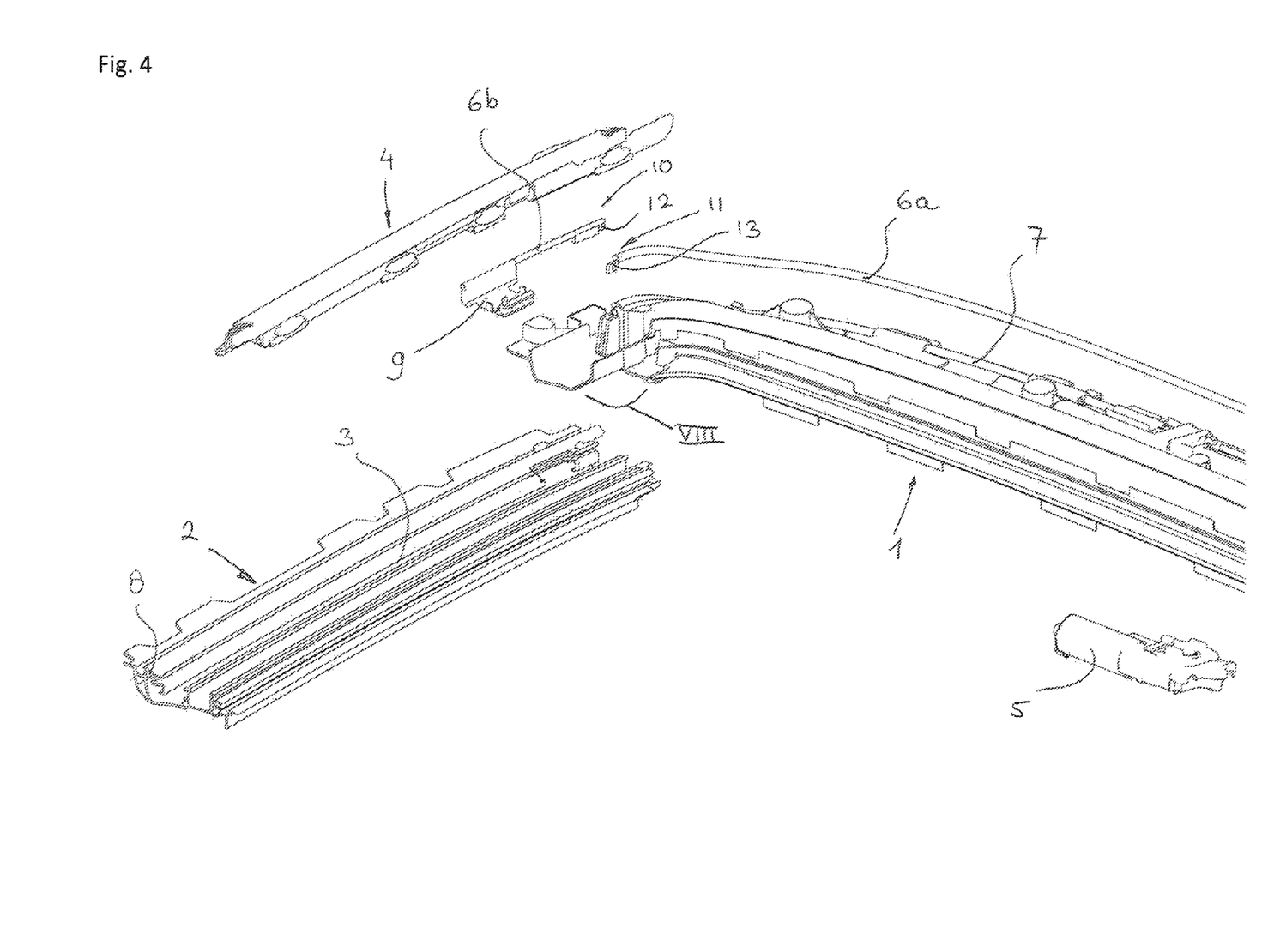
FIGS. 4-6 are views corresponding to that of FIGS. 1-3 but showing a roof assembly.
Figure 5:
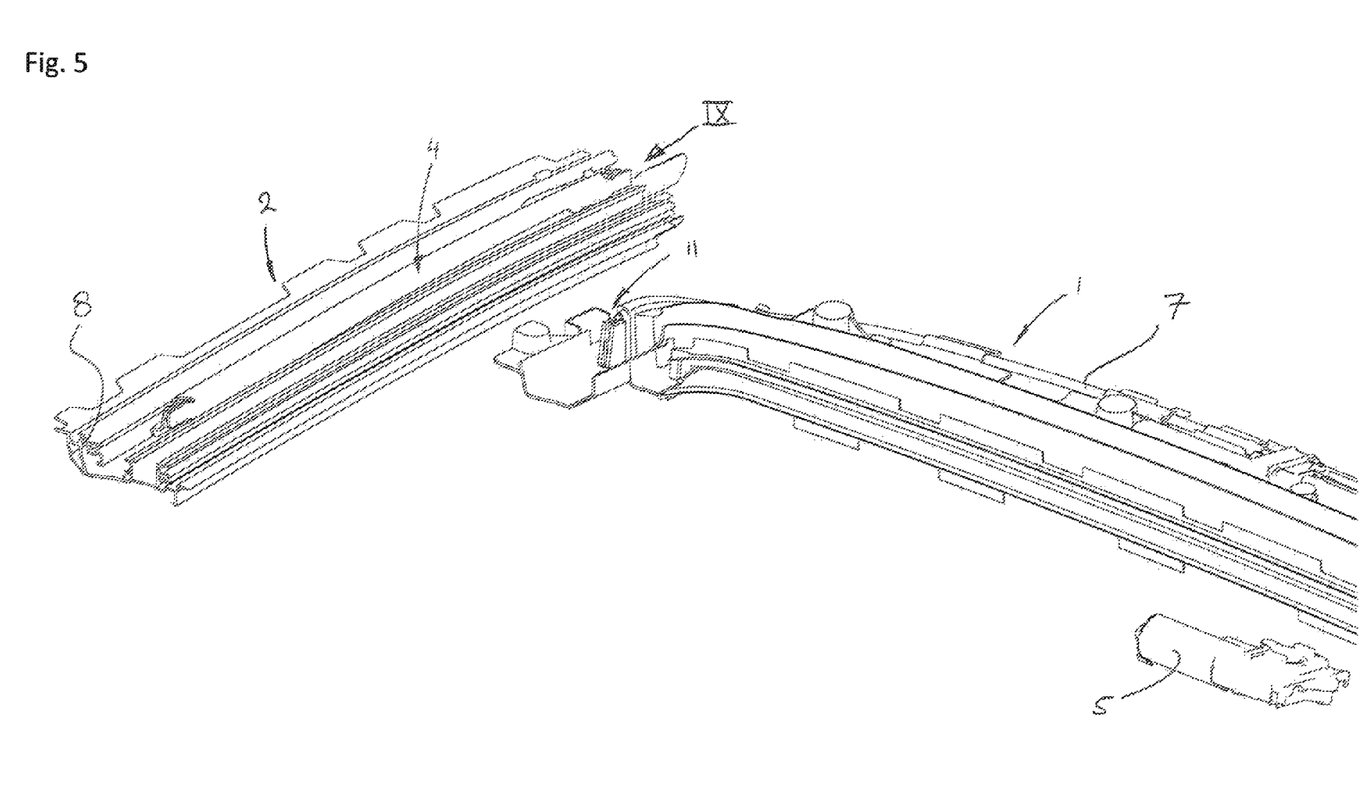

FIG. 4 shows the roof assembly in which this problem has been solved. The main difference with the prior art is that the drive element, in this case the drive cable 6 is now divided into a first drive cable portion 6a and a second drive cable portion 6b. The second drive cable portion 6b is a short part carrying the drive cable plate 9 with which the drive cable portion 6b is connected to the operating mechanism 4.

Figure 7:
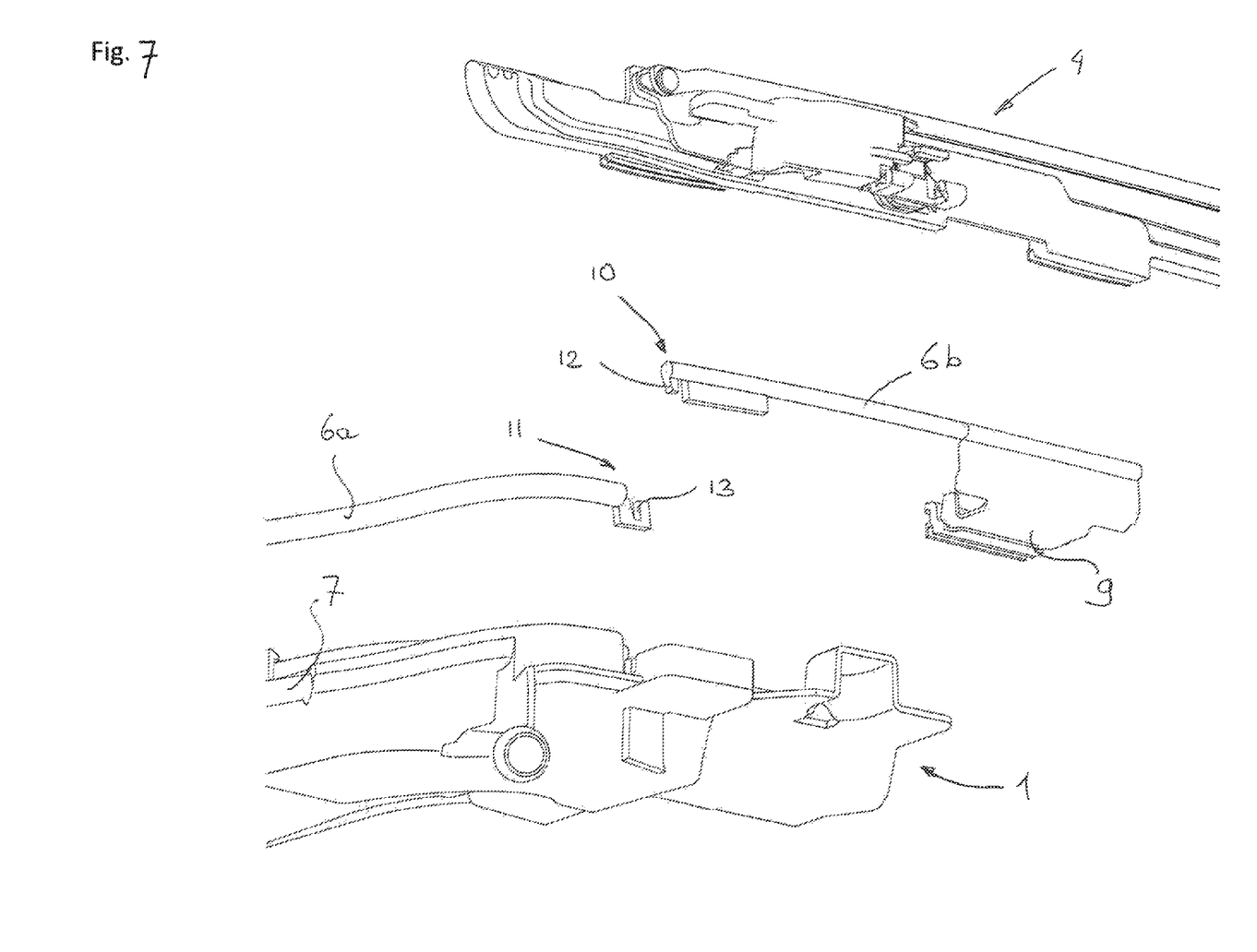
FIG. 7 is an enlarged exploded view of the front beam, operating mechanism and drive cable portions of the roof assembly of FIGS. 4-6.

In FIGS. 4 and 7 it is shown that the ends of the drive cable portions 6a and 6b are provided with a coupling member 10 and a counter coupling member 11. The coupling member 10 is in this case a hook 12 oriented downwardly (in position of use). The counter coupling member 11 is a recess 13 oriented upwardly so that the coupling member 10 can be coupled with the counter coupling member 11 in a downward movement, simultaneously with the connection of the front beam 1 and the longitudinal guide 2. For this purpose, the coupling member 10 and the counter coupling member 11 slightly protrude from their drive cable guide 7, 8, at least in their direction of connection (downward/upward), in order to be coupled.

Figure 6:
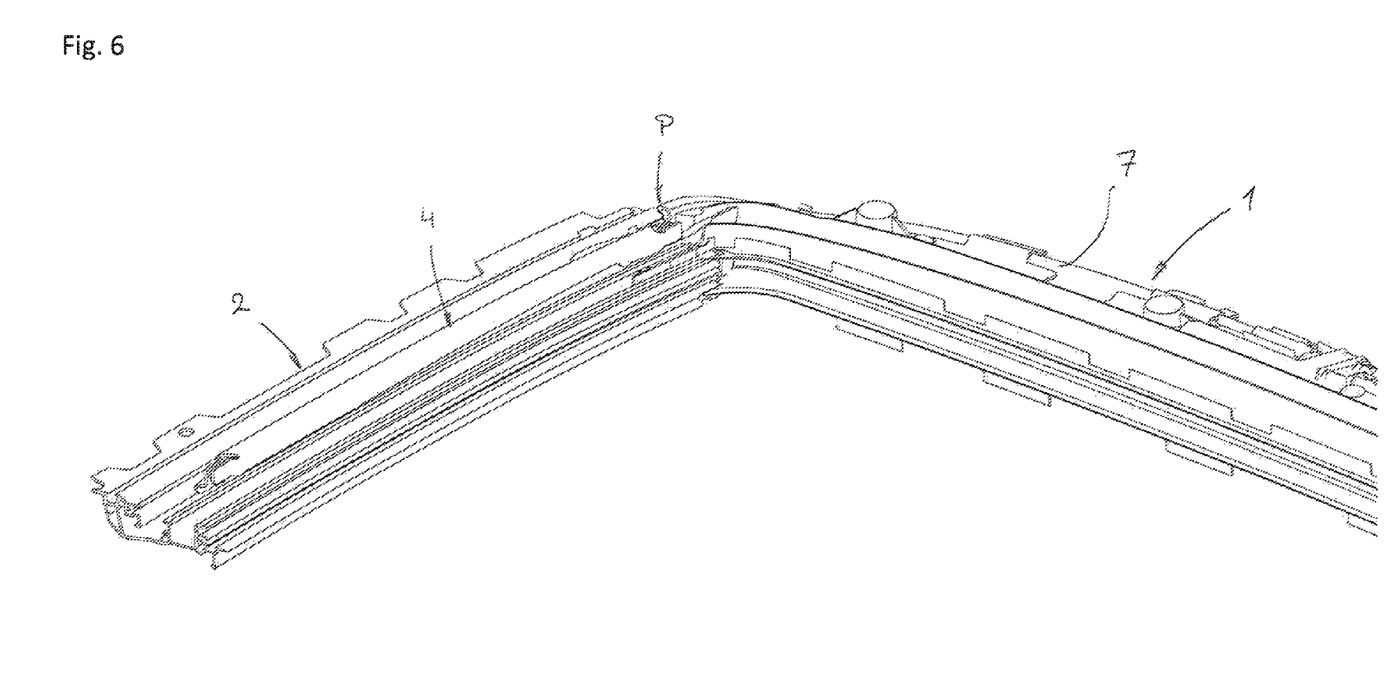
Figures 8, 9:
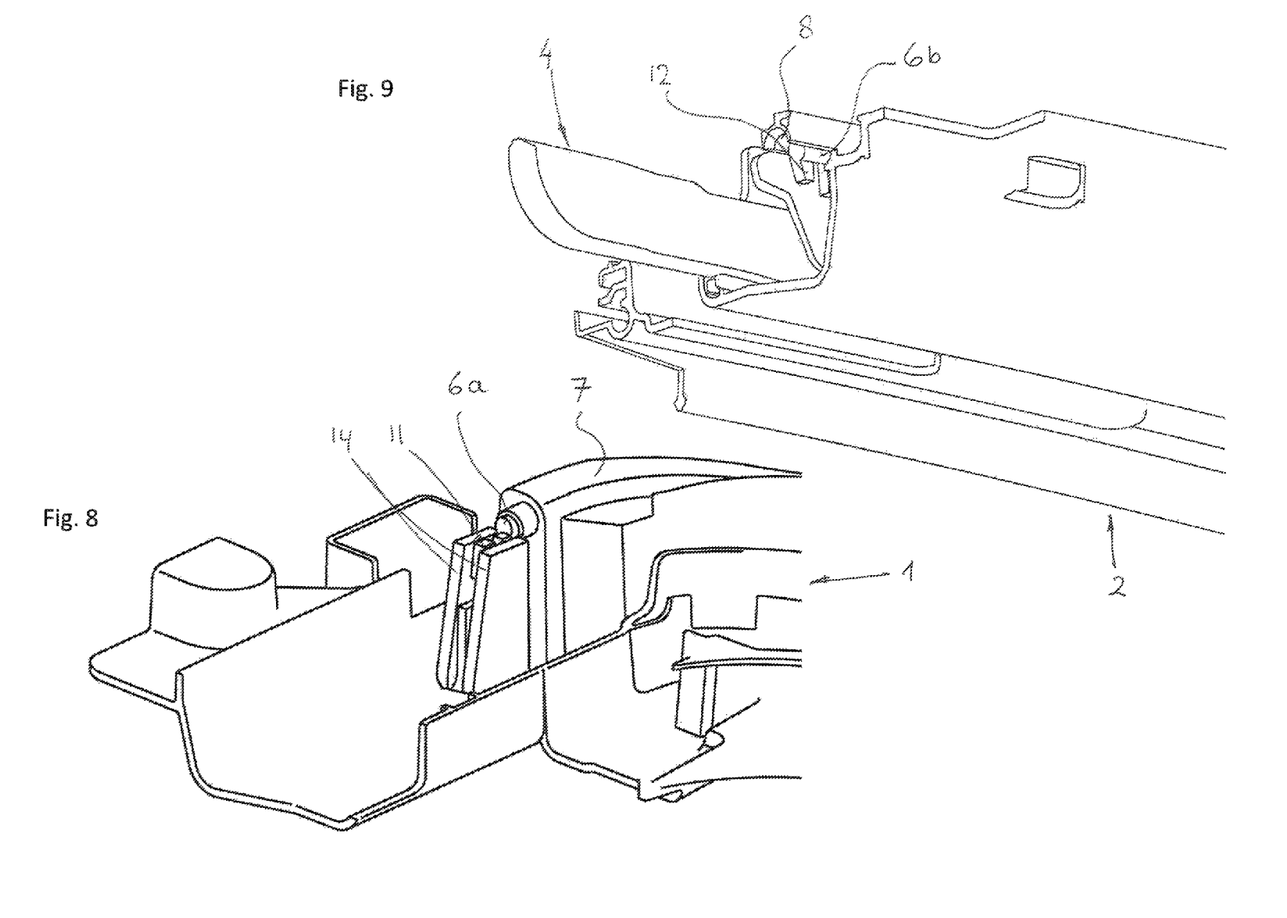
FIG. 8 shows detail VIII in FIG. 4 on an enlarged scale.
FIG. 9 is an enlarged perspective view according to arrow IX in FIG. 5, showing an end portion of the front beam of the roof assembly frame.

As is shown in FIGS. 4 and 8, there are guide walls 14 at the exit opening of the drive cable guide 7 in the front beam 1 to guide the coupling member 10 and counter coupling member 11 in lateral directions at the transition P (FIG. 6) between the drive cable guides 7, 8. The end of the drive cable guide 8 of the longitudinal guide 2 engages over the guide walls 14 and the drive cable guides 7, 8 engage the drive cable portions 6a, 6b over more than 180 degrees (see also FIG. 9), so that there is hardly any gap where the drive cable portions could deflect away from their normal position when large forces are exerted on the drive cable 6. The drive cable guide 7 in the front beam 1 can be closed all around the circumference as the coupling member 10 and counter coupling member 11 will only travel through the drive cable guide 8 of the longitudinal guide 2. The drive cable guide 7 of the front beam 1 will only guide the cylindrical drive cable portion 6a. This is caused by the fact the position of the drive cable portions 6a, 6b shown when the front beam 1 and the longitudinal guide 2 are connected is the front most position of the operating mechanism 4 and therefore of the cable 6. As a result, the coupling and counter coupling members 10, 11 will travel only from this position rearwardly into the drive cable guide 8 of the longitudinal guide 2.

Figure 10:
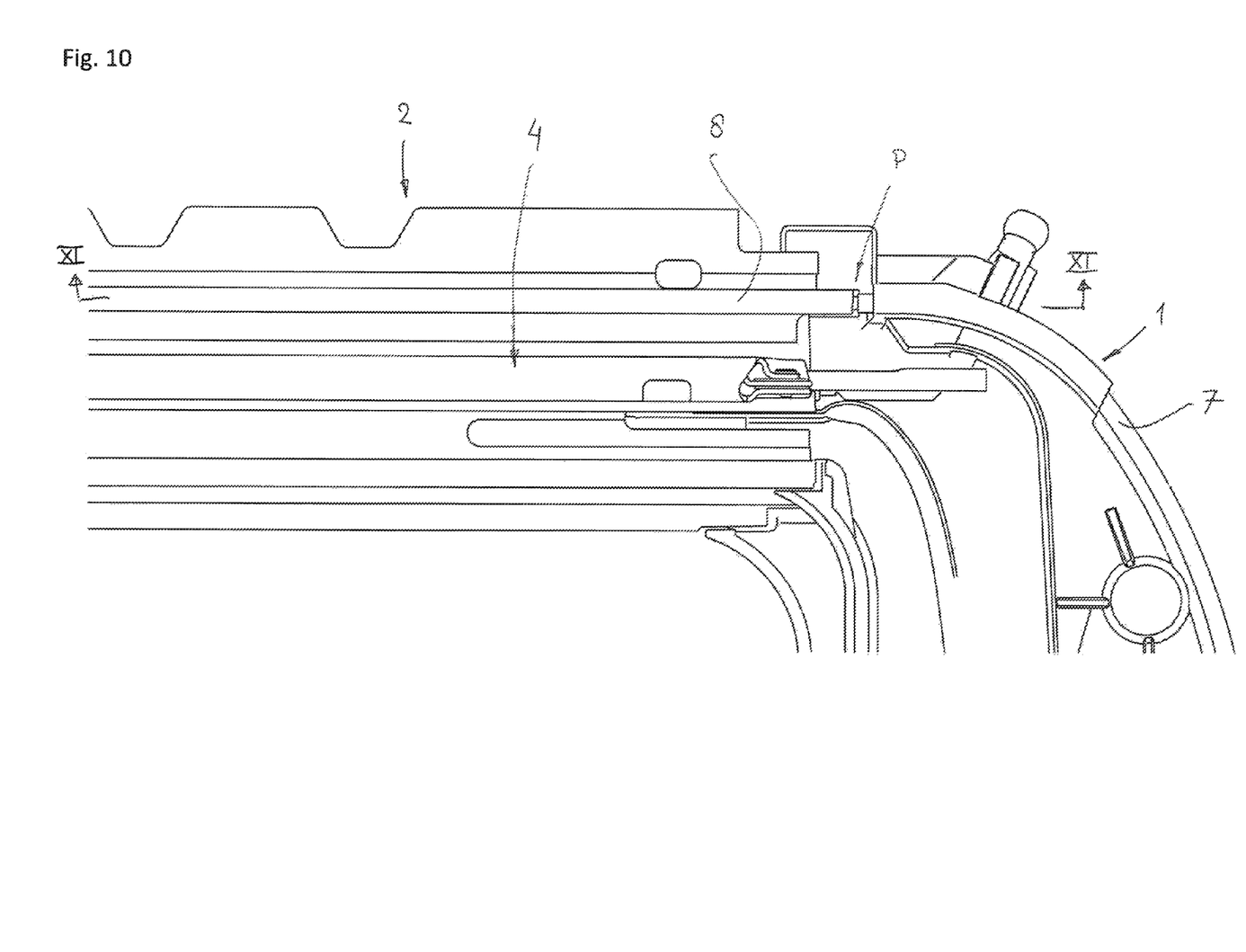
FIG. 10 is an enlarged top plan view of the roof assembly of FIG. 6.
Figure 11:
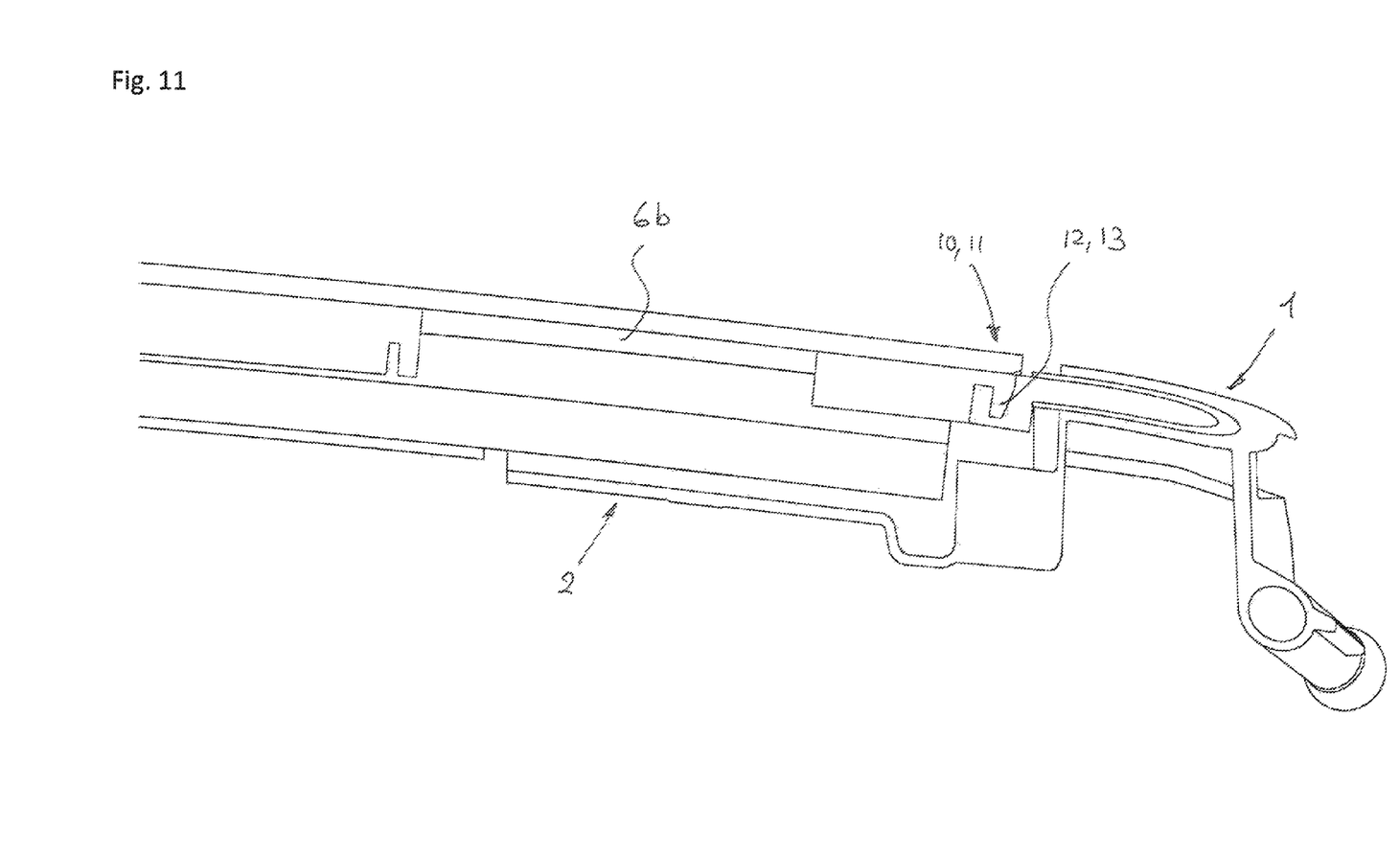
FIG. 11 is a sectional view according to the line XI-XI in FIG. 10.

FIGS. 10 and 11 are other (sectional) views showing the connection between the front beam 1 and longitudinal guide 2 and the coupling between the drive cable portions 6a, 6b in the embodiment of FIGS. 4-11.

FIGS. 12-16 show alternative coupling and counter coupling members 10, 11 to couple the drive cable portions 6a, 6b.

Figure 12A:
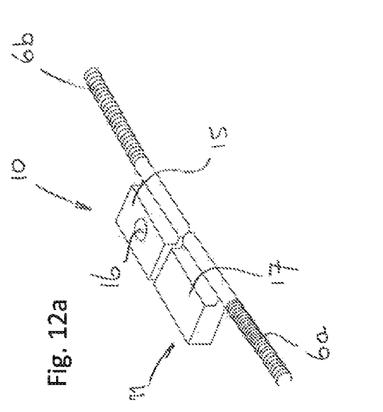
Figure 12B:
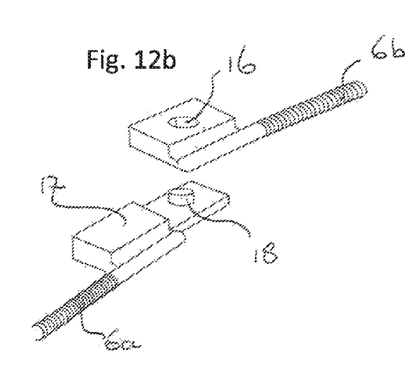
Figure 12C:
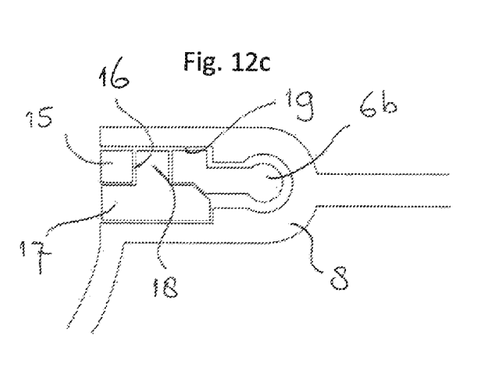

In FIG. 12a-c, the coupling member 10 includes a laterally projecting end piece 15 to the drive cable portion 6b comprising a hole 16 and the counter coupling member 11 includes an end piece 17 to the drive cable portion 6a comprising a protrusion 18 configured to enter the hole 16. As long as the end pieces 15, 17 are confined within a lateral chamber 19 of the drive cable guide 8, the coupling will be maintained.

Figure 13A:
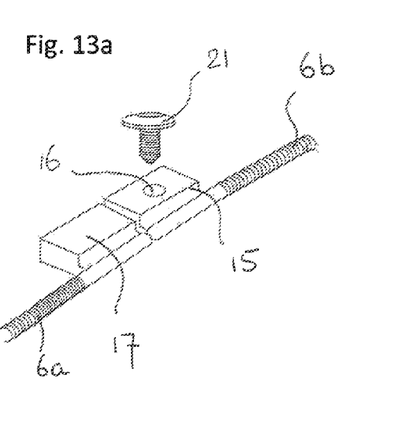
Figure 13B:
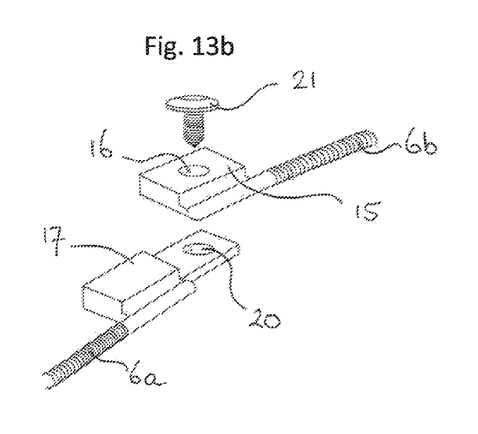
Figure 13C:
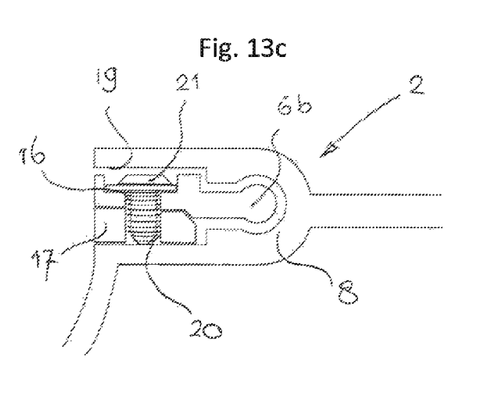

In FIG. 13a-c the protrusion 18 of the end piece 17 is replaced by a threaded hole 20 and a screw 21 engaging through the hole 16 in the end piece 15 of the drive cable portion 6b and into the threaded hole 20 in order to secure the coupling, even without the help of the drive cable guide 8, 19.

Figure 14A:
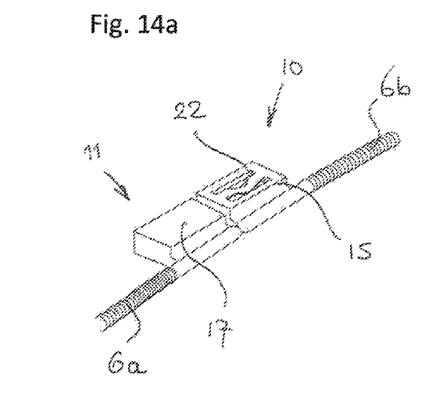
Figure 14B:
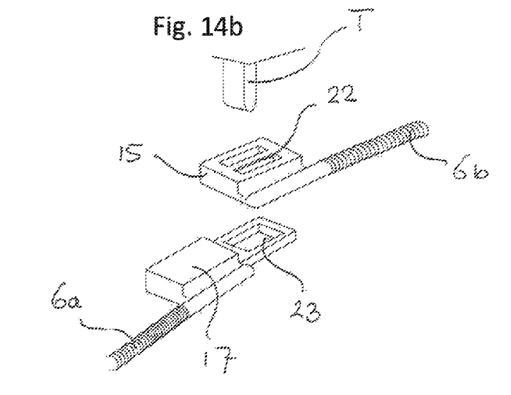
Figure 14C:
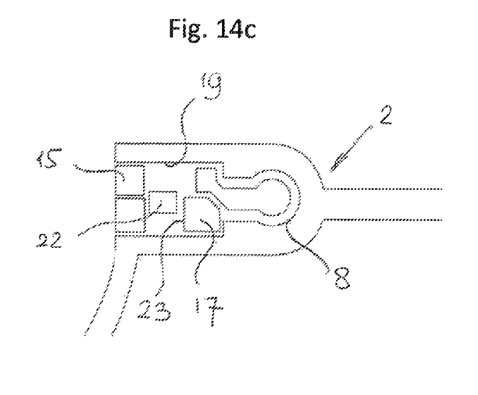

In FIG. 14a-c, the end piece 15 of the second drive cable portion 6b is provided with a deformable bridge 22. The end piece 17 of the counter coupling member 11 has a hole 23 or depression in which the bridge 22 can be deformed by a tool T in order to provide a connection between the coupling and counter coupling members 10, 11 together with the drive cable guide 8, 19.

Figure 15A:
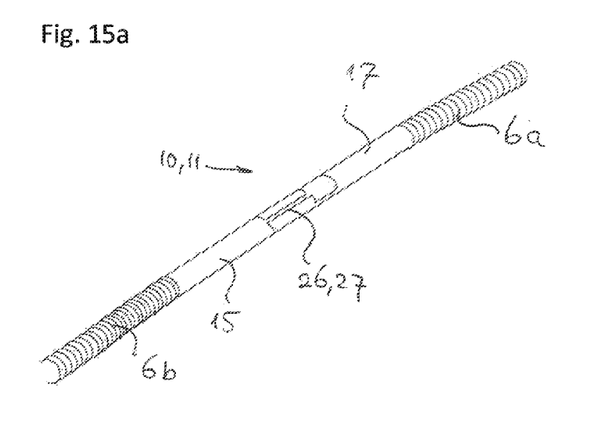
Figure 15B:
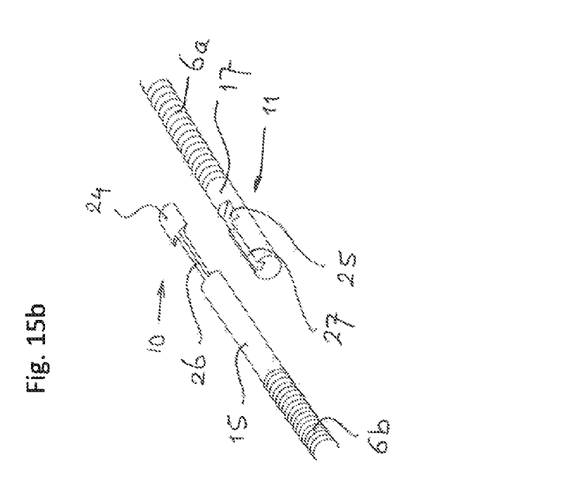
Figure 15C:
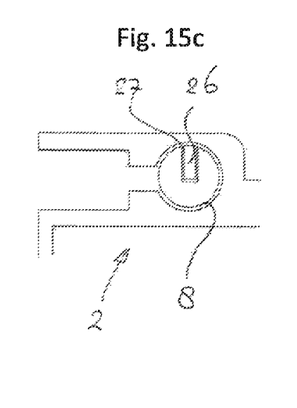

In FIG. 15a-c, the end pieces 15, 17 of the drive cable portions 6a, 6b are aligned with and substantially of the same size as the drive cable portions. The coupling member 10 has a shape 24 which is the same as the shape of the recess 25 in the counter coupling member 11 such that an enlarged end part engages the main portion of the recess 25, while a narrow stem portion engages a similar channel 27 in the end piece of the counter coupling member 11. The drive cable guide 8 maintains the coupling.

Figure 16A:
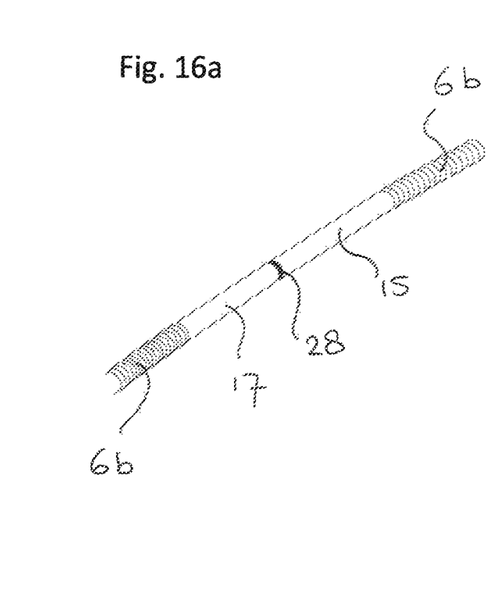
FIG. 16a, 16b are perspective views of a further embodiment of the coupling member and counter coupling member of the drive cable portions in coupled, and uncoupled conditions, respectively.
Figure 16B:
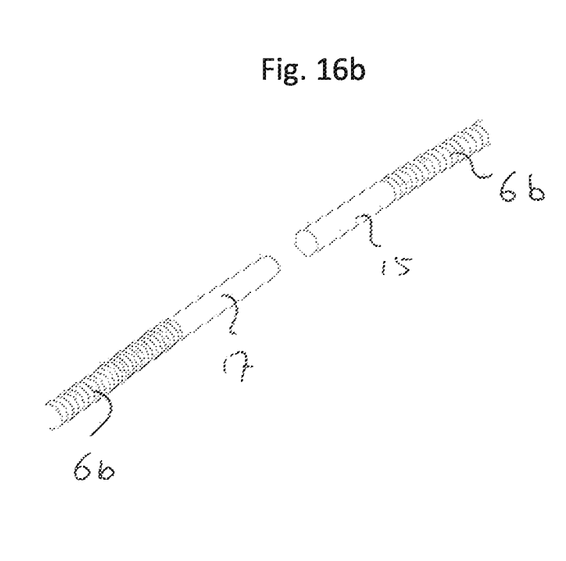

FIG. 16 shows a last alternative in which simple cylindrical end pieces 15, 17 are positioned head to head after which they are attached to each other in situ (FIG. 16a), for example by heat, by welding or by gluing, or similar fixing operations to form a connection 28.

From the above it will be clear that the invention provides an assembling process which enable short production times, while leading to a reliable drive chain between drive motor and movable part, in this case a reliable drive cable between the electric motor and the operating mechanism for the roof panel.

The invention is not limited to the embodiments described above which may be varied widely within the scope of the invention as defined by the appending claims. For example, it would be possible that only the first drive element portion is a cable, while the second drive element portion is a part of the operating mechanism which only makes sliding movements and which can be coupled directly to the first drive cable portion. The part of the operating mechanism should be extended to the front such that it is in the area where the drive element guides connect to each other. This area can be very short, but the area where the partly cut-away drive element guides of the front beam and longitudinal guide overlap may also extend over a certain length of e.g. 2-10 cm. One or both drive element portions may also be formed as a drive rod, for example. In the embodiments shown, the second frame part comprising the second cable portion carrying the coupling part is always moved downwardly onto the first frame part, and onto or into the counter coupling part of the first cable portion, but this could also be the other way around and all variations and combinations are conceivable of course.

What is claimed is:

1. A method of assembling a roof assembly for a vehicle, comprising:
providing a first frame part having a drive element guide;
providing a second frame part having a drive element guide; and
providing a drive element configured to drive a movable part of the roof assembly and being driven by a drive motor; and
mounting the first and second frame parts to each other such that the drive element extends from the drive element guide of the first frame part to the drive element guide of the second frame part, wherein the drive element is provided as a first drive element portion and a second drive element portion, the first drive element portion being pre-mounted in the drive element guide of the first frame part, the second drive element portion being pre-mounted in the drive element guide of the second frame part, the first and second drive element portions being coupled to each other when the first and second frame parts have been mounted to each other; and
wherein a first drive element coupling member of the first drive element portion and a second, complementary, drive element coupling member of the second drive element portion are automatically coupled upon connection of the first and second frame parts by engagement of the first and the second drive element coupling members when the first and second frame parts are engaged with each other.

2. The method of claim 1, wherein the first and second drive element portions are coupled to each other at a position close to a connection between the drive element guide of the first frame part to the drive element guide of the second frame part, in which the drive element portions protrude at least partly from the drive element guides.

3. The method of claim 1, wherein the second drive element portion is connected to the movable part before the first and second frame parts are connected to each other.

4. The method of claim 1 wherein the movable part is in its position closest to the first frame part when the drive element portions are interconnected.

5. The method of claim 1, wherein mounting the first and second frame parts to each other comprises vertical displacement of the frame parts relative to each other.

6. The method of claim 5, wherein the first and second drive element portions are coupled to each other with the vertical displacement of the frame parts relative to each other.

7. A roof assembly for a vehicle, comprising:
a frame;
at least one movable part supported by the frame;
a drive motor supported by the frame; and
a drive element guided by a cable guide supported by the frame and extending at least between the drive motor and the movable part, the frame including at least a first frame part and a second frame part mounted to each other, the drive element comprising at least first and second drive element portions which are configured to be coupled to each other close to an area where a drive element guide of the first frame part connects to a drive element guide of the second frame part;
wherein the first and second drive element portions are provided with a coupling and counter coupling member; and
wherein the coupling and counter coupling members are automatic coupling and counter coupling members configured to be aligned by the first and second frame parts when the first and second frame parts are engaged with each other.

8. The roof assembly of claim 7, wherein the coupling member includes a hook-like projection and the counter coupling member includes a recess capable of receiving the hook-like projection.

9. The roof assembly of claim 7, wherein the coupling and counter coupling members are provided with a fastening part to couple the coupling and counter coupling member together.

10. The roof assembly of claim 9, wherein the fastening part is a screw that is screwed into the coupling and counter coupling members.

11. The roof assembly of claim 7, wherein the drive element guides and the coupling and counter coupling members are such that the drive element guides prevent the coupling and counter coupling members from disengaging.

12. The roof assembly of claim 7, wherein the first and second drive element portions are connected to each other.

13. The roof assembly of claim 7, wherein at least one of the frame parts is provided with guide walls at a position where the drive element guide of the first frame part connects to the drive element guide of the second frame part in order to at least laterally guide the coupling and/or counter coupling member of the drive element portions.

14. The roof assembly of claim 7, wherein at least one of the drive element portions is a drive cable portion.

15. The roof assembly of claim 7, wherein the first frame part is a transverse beam, and the second frame part is a longitudinal guide rail of the frame guiding the movable part.

16. The roof assembly of claim 15, wherein the transverse beam supports the drive motor.

17. The roof assembly of claim 9, wherein the fastening part is a screw that is screwed into the coupling and counter coupling members, or a portion of the coupling member that is deformed by a tool to be coupled to the counter coupling member.

* * * * *